H. R. ROGERS.
SEAL.
APPLICATION FILED JUNE 18, 1921.
1,423,881. Patented July 25, 1922.
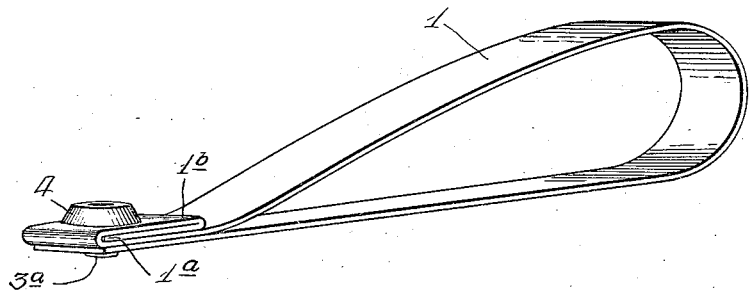
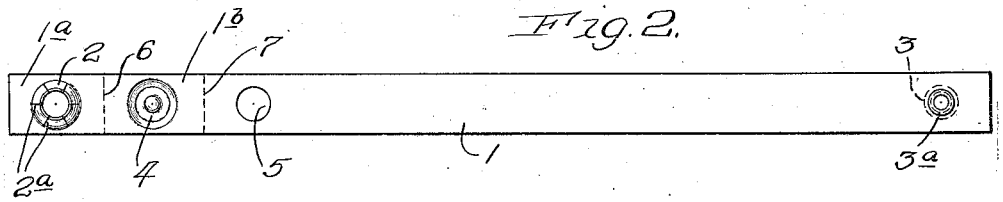
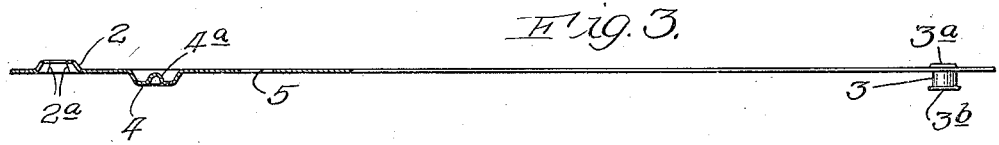
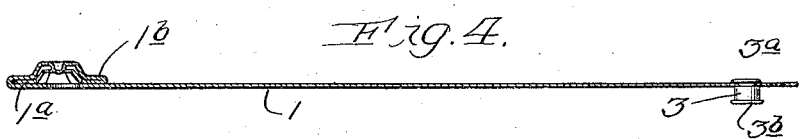
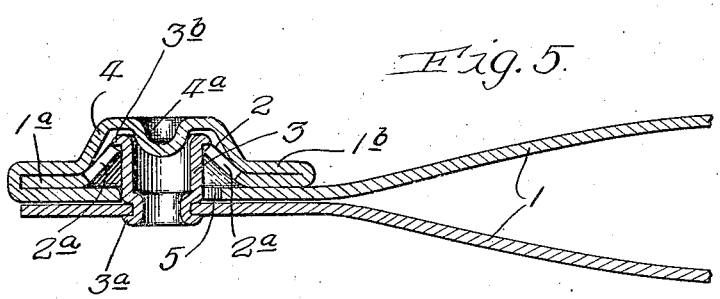
Inventor,
Harry R. Rogers.
By Dyrenforth, Lee, Chritton Wiles.
Attys.

UNITED STATES PATENT OFFICE.

HARRY R. ROGERS, OF CHICAGO, ILLINOIS, ASSIGNOR TO CHICAGO CAR SEAL COMPANY, OF CHICAGO, ILLINOIS, A CORPORATION OF ILLINOIS.

SEAL.

1,423,881.  Specification of Letters Patent.  Patented July 25, 1922.

Application filed June 18, 1921. Serial No. 478,560.

*To all whom it may concern:*

Be it known that I, HARRY R. ROGERS, a citizen of the United States, residing at Chicago, in the county of Cook and State of Illinois, have invented a new and useful Improvement in Seals, of which the following is a specification.

The present invention relates to snap seals, or self-locking seals. Such seals are adapted for sealing the doors of railway cars, and may be used in other situations.

The improved seal herein shown constitutes a modification of the invention set forth and claimed in my pending application Serial No. 478,559 filed in the United States Patent Office of even date herewith.

The invention is shown, in its preferred embodiment, in the accompanying drawing, in which—

Fig. 1 represents a perspective view of the improved seal, in its preferred embodiment, the seal being shown in locked condition; Fig. 2, a plan view of the seal before the folding operations are performed; Fig. 3, an edge view of the seal in the form shown in Fig. 2, the view being partly in longitudinal section; Fig. 4, a longitudinal sectional view showing the seal in completed condition; and Fig. 5, an enlarged broken sectional view showing the seal in locked condition.

In the embodiment shown, the seal comprises a shackle-strip 1 which is equipped at one end with a locking socket 2 and which is equipped at the other end with a locking stud 3. The locking socket 2 is preferably formed by cupping the metal near the extremity of the strip, punching out the bottom of the cupped portion, and slitting the sloping sides, or truncated annular cone which remains. The slits in the annular cone are designated $2^a$. The portions of the metal between the slits afford resilient locking prongs.

The strip is provided a short distance from the cup 4 with a perforation 5. After the strip has been manufactured in the form shown in Figs. 2 and 3, it is folded, first, on the line of folding 6 so as to reverse the position of the locking socket 2 and bring it within the cup 4; and the strip is then folded again on the line of folding 7 so as to again reverse the position of the locking socket and bring it to a position over the perforation 5.

The locking stud 3 is mounted on the opposite side of the strip. This stud is shown as a tubular member having a reduced shank which extends through a perforation in the end portion of the strip, the end portion of the shank being upset to form a retaining flange $3^a$. The free end of the locking stud is equipped with an external flange $3^b$ which is adapted to interlock with the inclined prongs which form the annular cone of the female locking member 2.

The end portion of the strip 1 in which the locking socket 2 is formed is designated $1^a$; and the adjacent portion of the strip in which the cup 4 is formed is designated $1^b$.

In the illustration given, the bottom of the cup 4 has the metal struck inwardly to provide an embossment $4^a$ which is adapted to enter the free end of the tubular locking stud 3 in the manner shown in Fig. 5.

Assuming the seal to be in the completed condition shown in Fig. 4, one end of the seal may be passed through the opening in the end of a pin which serves to secure the car-door hasp, the shackle-strip may then be sent into loop form, and the locking stud 3 may be entered in the locking stud 2. The locking members may be snapped together by pressure between the thumb and fingers.

It is preferred to offset the perforation 5 somewhat from the axis of the socket 2. This is preferably done by shifting the perforation slightly in a longitudinal direction from the position which it would occupy if directly coaxial with the locking socket. This will be readily understood from Fig. 5. By snapping the parts together, the locking stud may tilt slightly in the operation of entering the socket, but when fully entered will occupy a somewhat eccentric position with relation to the perforation 5. The result is that the withdrawal of the locking stud from the socket is rendered more difficult, the tendency of any strain upon the parts in an effort to effect separation being to force the locking stud against one wall of the perforation 5, so that the flange of the locking stud is very securely interlocked with the locking socket. Moreover, the projection or embossment $4^a$ with which the cup 4 is provided will be large enough to serve materially in preventing shifting of the locking stud after it has been entered. It will be noted that the area of interlock between the locking stud and locking socket is securely housed within the cup 4 and the space between said cup and the body of the shackle-strip 1. It will be noted also that the locking stud passes through a perforation in the shackle-strip and engages the locking socket on the opposite side of the shackle-strip. Thus, the ends of the shackle-strip are very securely fastened together, and disengagement cannot be effected without rupturing the strip.

The shackle-strip may be formed of suitable sheet metal. Tin may be employed or thin sheet steel may be employed, if desired.

The foregoing detailed description has been given for clearness of understanding only and no unnecessary limitations should be understood therefrom, but the appended claims should be construed as broadly as permissible in view of the prior art.

What I regard as new, and desire to secure by Letters Patent, is—

1. A seal comprising a shackle-strip, a locking stud carried by one end thereof, and a locking socket carried by the other end thereof, the metal of said strip being folded on itself so as to reverse the position of said socket and the double ply of metal thus formed being then folded on the adjoining portion of the strip, said adjoining portion being provided with a perforation to admit the locking stud to the socket, said stud and socket being located on opposite sides of the strip.

2. A seal comprising a shackle-strip having a locking socket formed integrally therewith at one extreme end, the strip being folded to cover one end of the socket and then folded again to bring the uncovered end of the socket adjacent the body of the strip, the strip being provided with a perforation beneath the uncovered end of the socket, and a locking stud carried by the other end of the strip and located on the other side of the strip.

3. A seal comprising a shackle-strip having a locking socket formed integrally therewith at one extreme end of the strip and projecting in one direction from the plane of the strip, the strip being provided in an adjoining portion with a cup serving to accommodate said socket and being provided near said cup with a perforation, the strip being folded on itself to bring said socket into said cup and then folded again upon itself to bring the uncovered end of the socket over said perforation, and a locking stud carried by the other end of said strip and located on the opposite side of said strip, whereby said locking stud may extend through said perforation and engage said socket.

4. A seal comprising a shackle-strip having a locking socket formed integrally therewith at one extreme end of the strip and projecting in one direction from the plane of the strip, the strip being provided in an adjoining portion with a cup serving to accommodate said socket and being provided near said cup with a perforation, the strip being folded on itself to bring said socket into said cup and then folded again upon itself to bring the uncovered end of the socket over said perforation, and a locking stud carried by the other end of said strip and located on the opposite side of said strip, whereby said locking stud may extend through said perforation and engage said socket, said perforation being located in a position eccentric with relation to the axis of the socket and locking stud.

HARRY R. ROGERS.